United States Patent
LeCrone et al.

(10) Patent No.: US 11,265,374 B2
(45) Date of Patent: Mar. 1, 2022

(54) CLOUD DISASTER RECOVERY

(71) Applicant: EMC IP Holding Company LLC, Hopkinton, MA (US)

(72) Inventors: Douglas E. LeCrone, Hopkinton, MA (US); Brett A. Quinn, Lincoln, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/653,029

(22) Filed: Oct. 15, 2019

(65) Prior Publication Data

US 2021/0112120 A1    Apr. 15, 2021

(51) Int. Cl.
| G06F 15/173 | (2006.01) |
| H04L 67/1095 | (2022.01) |
| H04L 67/1097 | (2022.01) |

(52) U.S. Cl.
CPC ...... *H04L 67/1095* (2013.01); *H04L 67/1097* (2013.01)

(58) Field of Classification Search
None
See application file for complete search history.

(56) References Cited

U.S. PATENT DOCUMENTS

| 6,366,986 | B1 | 4/2002 | St. Pierre et al. |
| 7,054,883 | B2 | 5/2006 | Meiri et al. |
| 7,340,489 | B2 | 3/2008 | Vishlitzky et al. |
| 7,475,207 | B2 | 1/2009 | Bromling et al. |
| 7,558,926 | B1 | 7/2009 | Oliveira et al. |
| 7,716,435 | B1 | 5/2010 | Allen |
| 7,779,291 | B2 | 8/2010 | Yoder et al. |
| 8,046,545 | B2 | 10/2011 | Meiri et al. |
| 8,151,069 | B1 | 4/2012 | Blitzer et al. |
| 8,250,033 | B1 | 8/2012 | De Souter et al. |
| 8,352,431 | B1 | 1/2013 | Protopopov et al. |

(Continued)

FOREIGN PATENT DOCUMENTS

WO     WO-2011002777 A2 *   1/2011  .........  G06F 16/1844

OTHER PUBLICATIONS

EMC Corporation, "EMC RecoverPoint CDP: Continuous Data Protection for Operational Recovery, Applied Technology," White paper H6181.2, Feb. 2011, 22 pp.

*Primary Examiner* — Phyllis A Book
(74) *Attorney, Agent, or Firm* — Muirhead and Saturnelli, LLC

(57) ABSTRACT

Maintaining versions of data from a storage system includes detecting that a snapshot of the data has been performed at the storage device, transferring a previous version of the data to a cloud storage, and prohibiting deletion of the snapshot until the previous version of the data has been completely transferred to the cloud storage. The data may be a volume on the storage system. The cloud storage may be public cloud storage or part of a private network. The cloud storage may be accessible from any location via the World Wide Web. A connection between the storage device and the cloud storage may be provided by the Internet, a TCP/IP network, a dedicated connection, or a FICON connection. The snapshot may store a log entry in a log device corresponding to a particular point-in-time version of the data prior to data being written to the storage device.

18 Claims, 14 Drawing Sheets

(56) References Cited

U.S. PATENT DOCUMENTS

| | | | |
|---|---|---|---|
| 8,515,911 B1 | 8/2013 | Zhou et al. | |
| 9,128,901 B1 | 9/2015 | Nickurak et al. | |
| 9,170,904 B1 | 10/2015 | LeCrone et al. | |
| 9,665,307 B1 | 5/2017 | LeCrone et al. | |
| 9,678,968 B1* | 6/2017 | Taylor | G06F 3/0608 |
| 9,892,002 B1 | 2/2018 | LeCrone et al. | |
| 2015/0227602 A1* | 8/2015 | Ram | G06F 16/2365 |
| | | | 707/634 |
| 2015/0331635 A1* | 11/2015 | Ben-Shaul | G06F 3/061 |
| | | | 711/120 |
| 2017/0118290 A1* | 4/2017 | Mitkar | H04L 67/1097 |
| 2017/0262347 A1* | 9/2017 | Dornemann | G06F 9/45558 |
| 2017/0286228 A1* | 10/2017 | Redko | G06F 11/1446 |
| 2017/0366606 A1* | 12/2017 | Ben-Shaul | G06F 3/064 |
| 2018/0196817 A1* | 7/2018 | Maybee | G06F 3/061 |
| 2018/0285234 A1* | 10/2018 | Degaonkar | G06F 11/079 |
| 2018/0293261 A1* | 10/2018 | Barack | H04L 67/1097 |
| 2019/0179805 A1* | 6/2019 | Prahlad | G06F 16/1827 |
| 2019/0182322 A1* | 6/2019 | Kumar | G06F 3/0638 |
| 2019/0220360 A1* | 7/2019 | Kashi Visvanathan | G06F 3/0608 |
| 2019/0347009 A1* | 11/2019 | Andken | G06F 3/0608 |
| 2020/0034248 A1* | 1/2020 | Nara | G06F 11/1464 |

\* cited by examiner

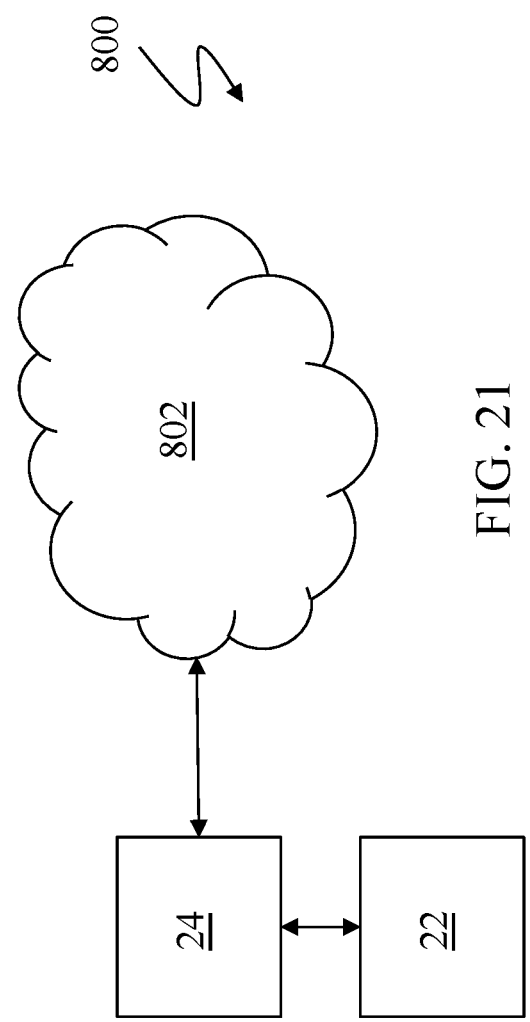

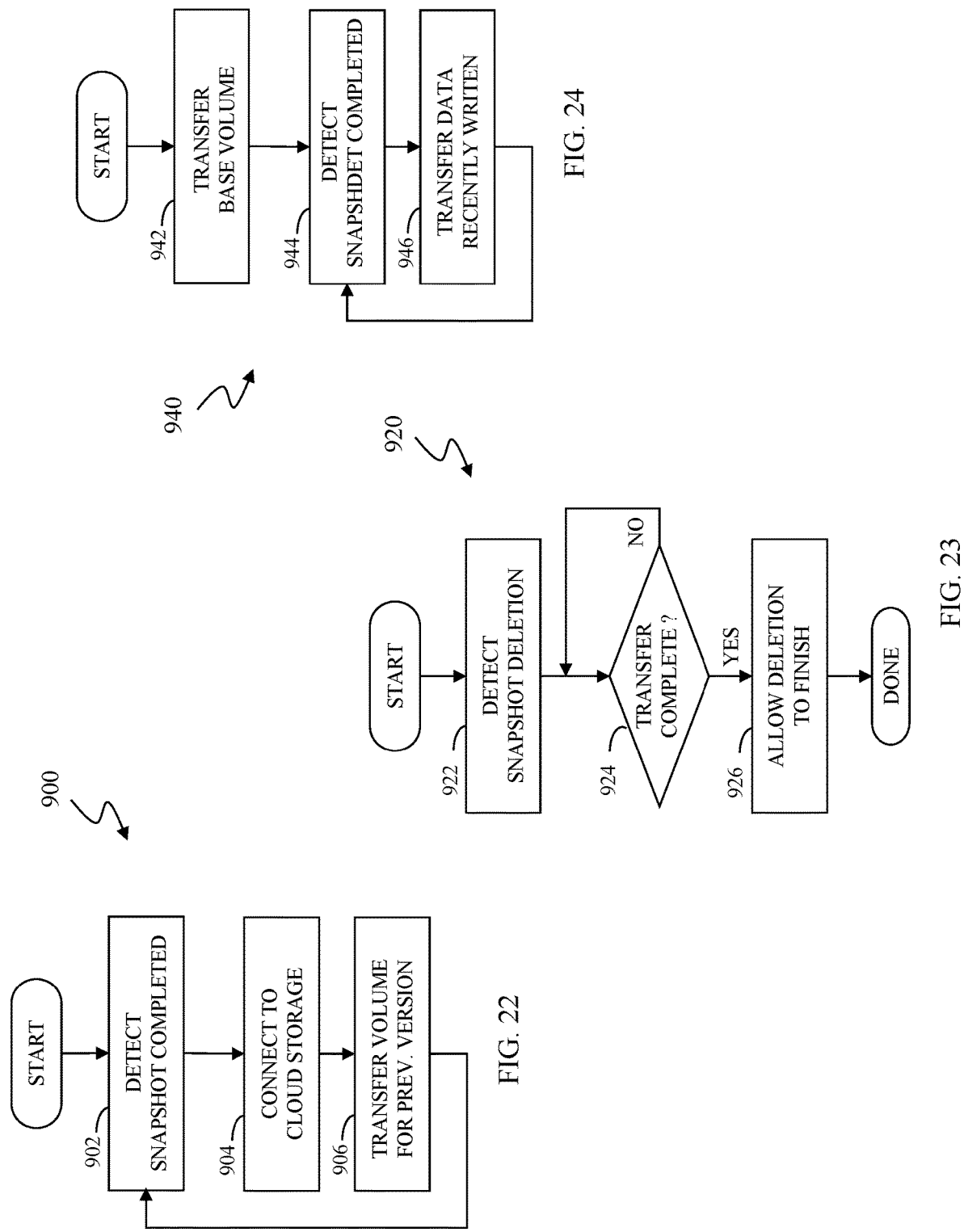

_US 11,265,374 B2_

CLOUD DISASTER RECOVERY

TECHNICAL FIELD

This application relates to the field of computer systems and storage systems therefor and, more particularly, to the field of using cloud storage to facilitate disaster recovery for storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

In some cases, it is desirable to provide continuous or near continuous backup of past data at different points of time so that it is possible to roll back the data to an earlier state. This is useful in instances where data corruption is detected. In such a case, the data is rolled back to a state that existed at a time just prior to the corruption occurring. A system for doing this is disclosed, for example, in U.S. Pat. No. 9,665,307 to LeCrone, et al. A drawback to this system, however, is that only a finite number of prior versions may be retained and thus it may not be possible to roll back to a point in time that is earlier than the retention period. Furthermore, in instances where an entire data center becomes non-operational, the ability to roll back the data to any point in time will not be available.

Accordingly, it is desirable to provide a mechanism that allows restoring data to a previous point in time independent of a state of data at a data center.

SUMMARY OF THE INVENTION

According to the system described herein, maintaining versions of data from a storage system includes detecting that a snapshot of the data has been performed at the storage device, transferring a previous version of the data to a cloud storage, and prohibiting deletion of the snapshot until the previous version of the data has been completely transferred to the cloud storage. The data may correspond to a volume on the storage system. The cloud storage may be public cloud storage. The cloud storage may be part of a private network. The cloud storage may be accessible from any location via the World Wide Web. A connection between the storage device and the cloud storage may be provided by the Internet, a TCP/IP network, a dedicated connection, or a FICON connection. The snapshot may store at least one log entry in a log device corresponding to a particular point-in-time version of the data prior to data being written to the storage device.

According further to the system described herein, maintaining versions of data from a storage system includes transferring an initial version of the data from the storage system to a cloud storage, detecting that a snapshot of the data has been performed at the storage device, transferring to the cloud storage data that is written to the storage device, and prohibiting deletion of the snapshot until the previous version of the data has been completely transferred to the cloud storage. The data may correspond to a volume on the storage system. The cloud storage may be public cloud storage. The cloud storage may be part of a private network. The cloud storage may be accessible from any location via the World Wide Web. A connection between the storage device and the cloud storage may be provided by the Internet, a TCP/IP network, a dedicated connection, or a FICON connection. The snapshot may store at least one log entry in a log device corresponding to a particular point-in-time version of the data prior to data being written to the storage device.

According further to the system described herein, a non-transitory computer readable medium contains software that maintains versions of data from a storage system. The software includes executable code that detects that a snapshot of the data has been performed at the storage device, executable code that transfers a previous version of the data to a cloud storage, and executable code that prohibits deletion of the snapshot until the previous version of the data has been completely transferred to the cloud storage. The data may correspond to a volume on the storage system. The cloud storage may be public cloud storage. The cloud storage may be part of a private network. The cloud storage may be accessible from any location via the World Wide Web. A connection between the storage device and the cloud storage may be provided by the Internet, a TCP/IP network, a dedicated connection, or a FICON connection.

BRIEF DESCRIPTION OF THE DRAWINGS

Embodiments of the system are described with reference to the several figures of the drawings, noted as follows.

FIG. 21 is a flow diagram that illustrates processing performed by a storage system in connection with detecting and handling possible data corruption according to an embodiment of the system described herein.

FIG. 22 is a flow diagram that illustrates processing performed by a storage system in connection with collecting initial values and setting thresholds according to an embodiment of the system described herein.

FIG. 23 is a flow diagram that illustrates processing performed in connection with detecting if there has been unusual access for a portion of data according to an embodiment of the system described herein.

FIG. 24 is a flow diagram that illustrates steps performed in connection with a checking and resetting a flag that is set each time a particular data unit is accessed according to an embodiment of the system described herein.

DETAILED DESCRIPTION OF VARIOUS EMBODIMENTS

The system described herein provides a mechanism for using cloud storage for disaster recovery of continuous point-in-time consistent snapshots of a storage system. For each point-in-time snapshot that is obtained, an entire copy of the corresponding data is transferred to the cloud storage. The system monitors when snapshots are being deleted and waits for the data to be copied to the cloud before allowing a snapshot deletion to proceed.

Figure 1:
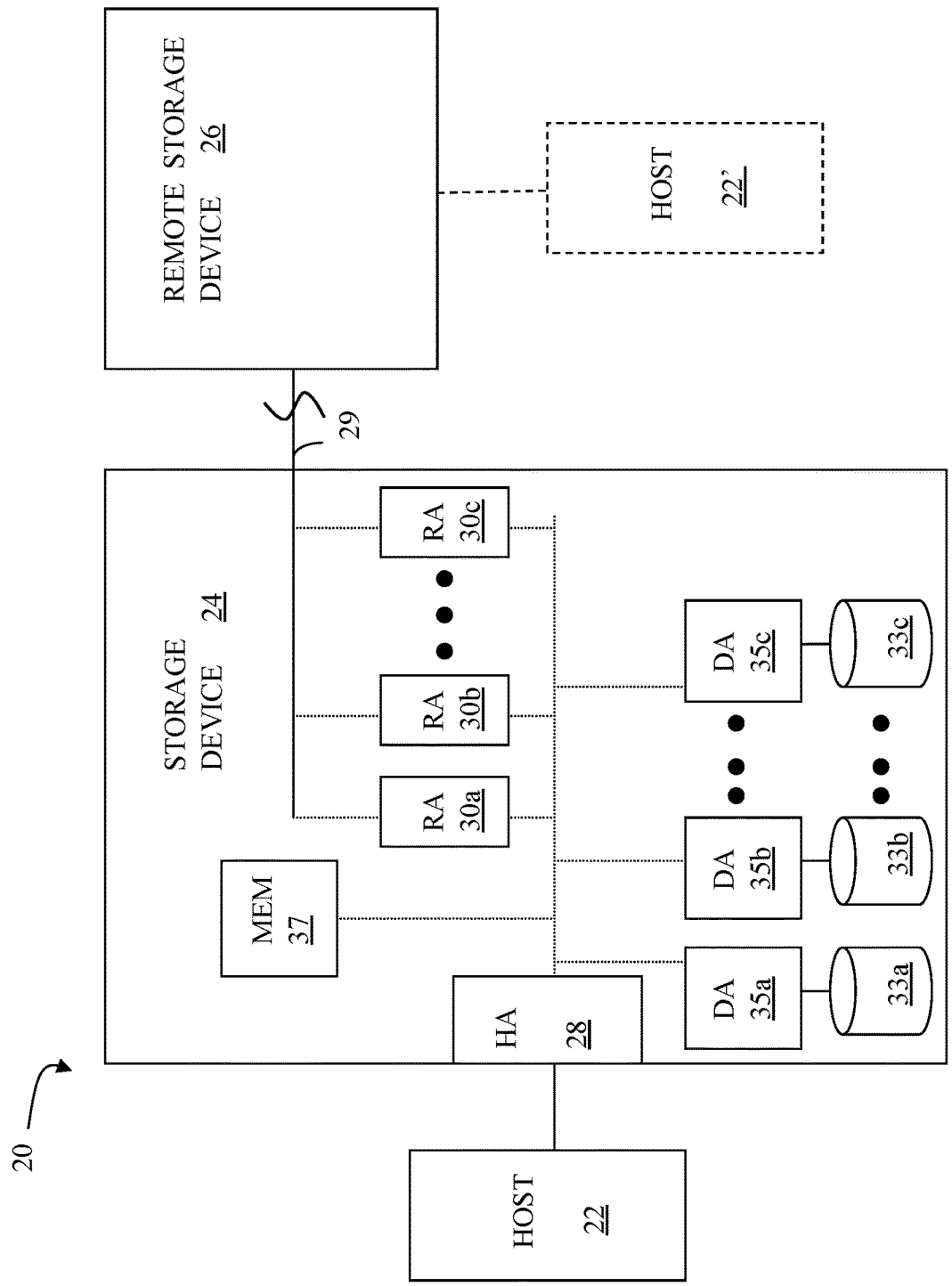
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
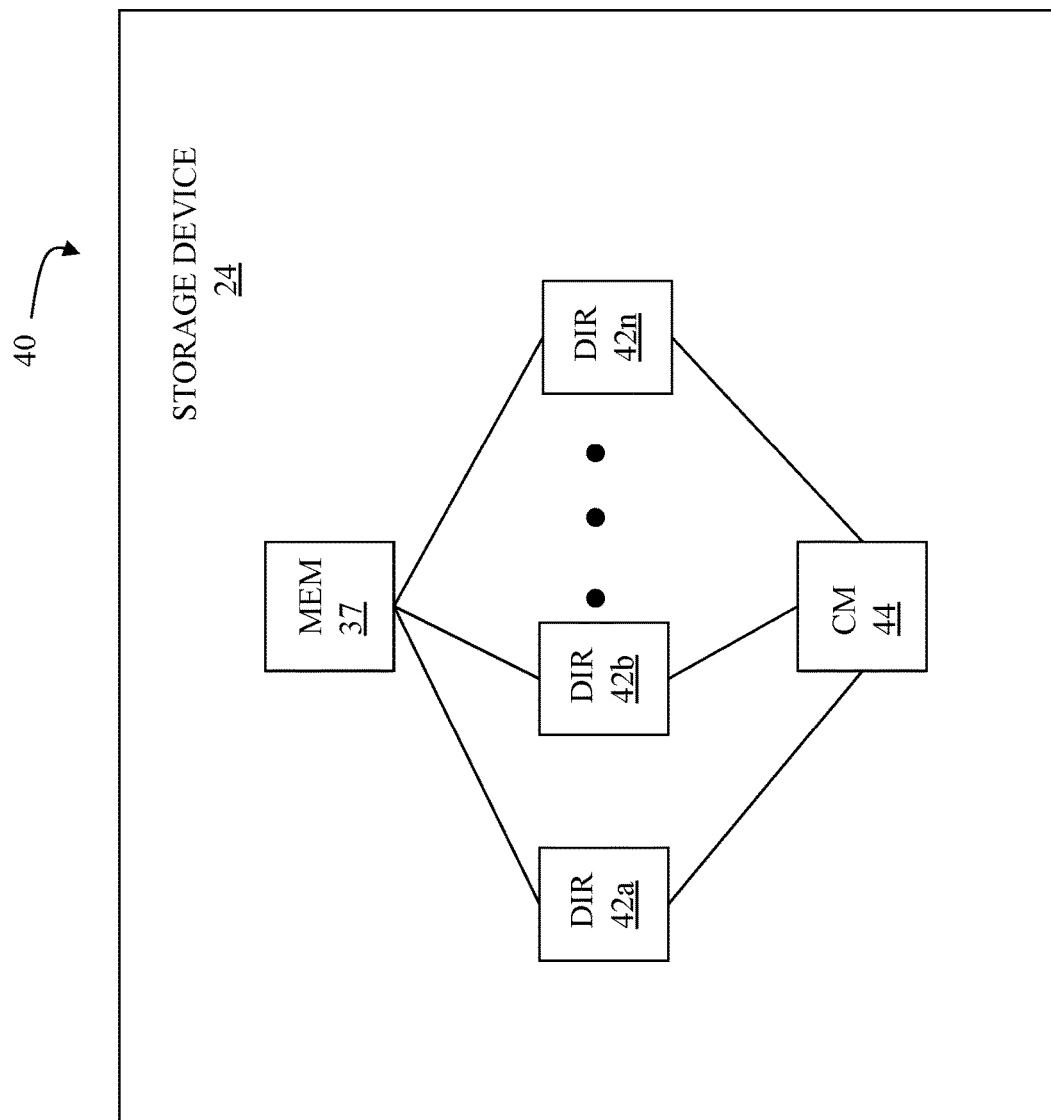
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage systems in a manner that allows reconfiguring connections without having to physically disconnect and reconnect cables from and to ports of the devices. A storage area network may be implemented using one or more switches to which the storage systems and the host devices are coupled. The switches may be programmed to allow connections between specific ports of devices coupled to the switches. A port that can initiate a data-path connection may be called an "initiator" port while the other port may be deemed a "target" port.

Figure 3:
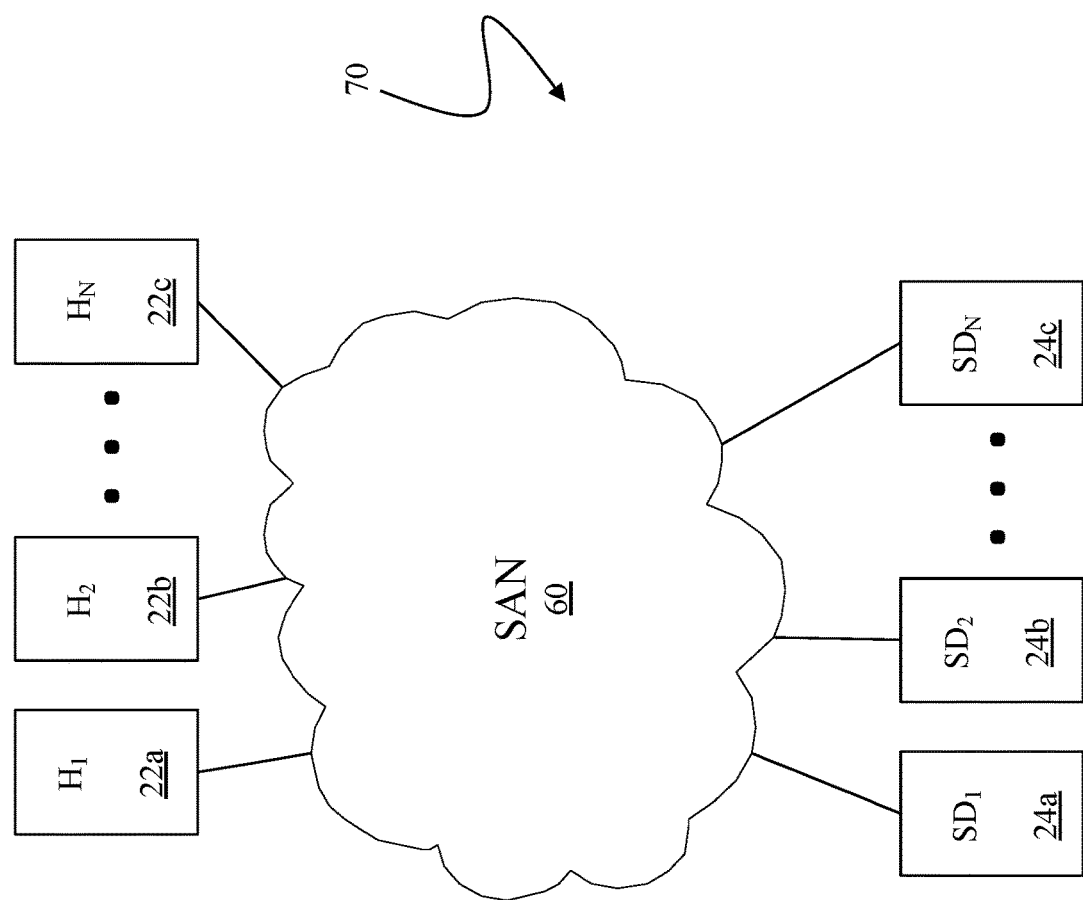
FIG. 3 is a schematic illustration showing a storage area network (SAN) providing a SAN fabric coupling a plurality of host devices to a plurality of storage systems that may be used in connection with an embodiment of the system described herein.

FIG. 3 is a schematic illustration 70 showing a storage area network (SAN) 60 providing a SAN fabric coupling a plurality of host devices ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage systems, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

Figure 4:
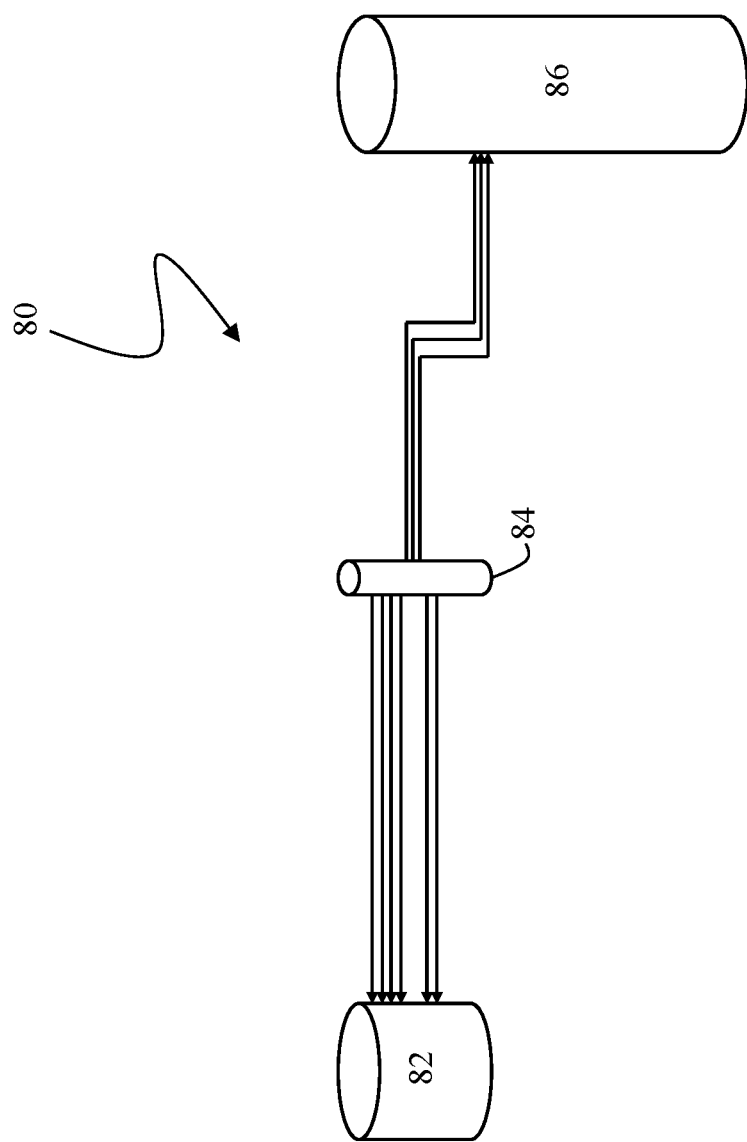
FIG. 4 is a schematic diagram showing a standard logical device, a point-in-time image device, and a journal (or log) device that may be used in connection with an embodiment of the system described herein

FIG. 4 is a schematic diagram 80 showing a standard logical device 82, a point-in-time image device 84, such as a snapshot image device and/or other appropriate point-in-time image device, and a journal (or log) device 86 that may be used in connection with an embodiment of the system described herein. The standard logical device 82 may be implemented using any appropriate storage logical device mechanism, such as logical storage devices used on a Symmetrix and/or VPLEX product provided by EMC Corporation, and used to access corresponding physical storage disks, like disks 36a-c (see FIG. 1). Similarly, the point-in-time image device 84 may be any logical or virtual device that can provide point-in-time image (or version) functionality for the logical device 82. As discussed herein, the point-in-time image device 84 may represent a point-in-time image of all or a portion of the standard logical device 82. A host coupled to a storage system that accesses the point-in-time image device 84 may access the point-in-time image device 84 in the same way that the host would access the standard logical device 82. However, the point-in-time image device 84 does not contain any track data from the standard logical device 82. Instead, the point-in-time image device 84 includes a plurality of table entries that point to tracks on either the standard logical device 82 or the journal device 86.

When the point-in-time image device 84 is established (e.g., when a point-in-time image is made of the standard logical device 82), the point-in-time image device 84 is created and provided with appropriate table entries that, at the time of establishment, point to tracks of the standard logical device 82. A host accessing the point-in-time image device 84 to read a track would read the appropriate track from the standard logical device 82 based on the table entry of the point-in-time image device 84 pointing to the track of the standard logical device 82.

After the point-in-time image device 84 has been established, it is possible for a host to write data to the standard logical device 82. In that case, the previous data that was stored on the standard logical device 82 may be copied to the journal device 86 and the table entries of the point-in-time image device 84 that previously pointed to tracks of the standard logical device 82 would be modified to point to the new tracks of the journal device 86 to which the data had been copied. Thus, a host accessing the point-in-time image device 84 may read either tracks from the standard logical device 82 that have not changed since the point-in-time image device 84 was established or, alternatively, may read corresponding tracks from the journal device 86 that contain data copied from the standard logical device 82 after the point-in-time image device 84 was established. Adjusting data and pointers in connection with reads and writes to and from the standard logical device 82 and journal device 84 is discussed in more detail elsewhere herein.

In an embodiment described herein, hosts may not have direct access to the journal device 86. That is, the journal device 86 would be used exclusively in connection with the point-in-time image device 84 (and possibly other point-in-time image devices as described in more detail elsewhere herein). In addition, for an embodiment described herein, the standard logical device 82, the point-in-time image device 84, and the journal device 86 may be provided on the single storage system 24. However, it is also possible to have portions of one or more of the standard logical device 82, the point-in-time image device 84, and/or the journal device 86 provided on separate storage systems that are appropriately interconnected.

It is noted that the system described herein may be used with data structures and copy mechanisms other than tables and/or pointers to tracks discussed, for example, in connection with snapshots and/or other point-in-time images. For example, the system described herein may also operate in connection with use of clones and/or deep copy backups automatically synchronized between data and metadata. Accordingly, the system described herein may be applied to any appropriate point-in-time image processing systems and techniques, and it should be understood that the discussions herein with respect to the creation and use of snapshots, and the devices thereof, may be equally applied to the use of any appropriate point-in-time image used for point-in-time image processes in connection with protection of data and configuration metadata that enable the rolling back/forward of a storage system using the point-in-time images of the data and configuration metadata according to the system described herein.

Figure 5:
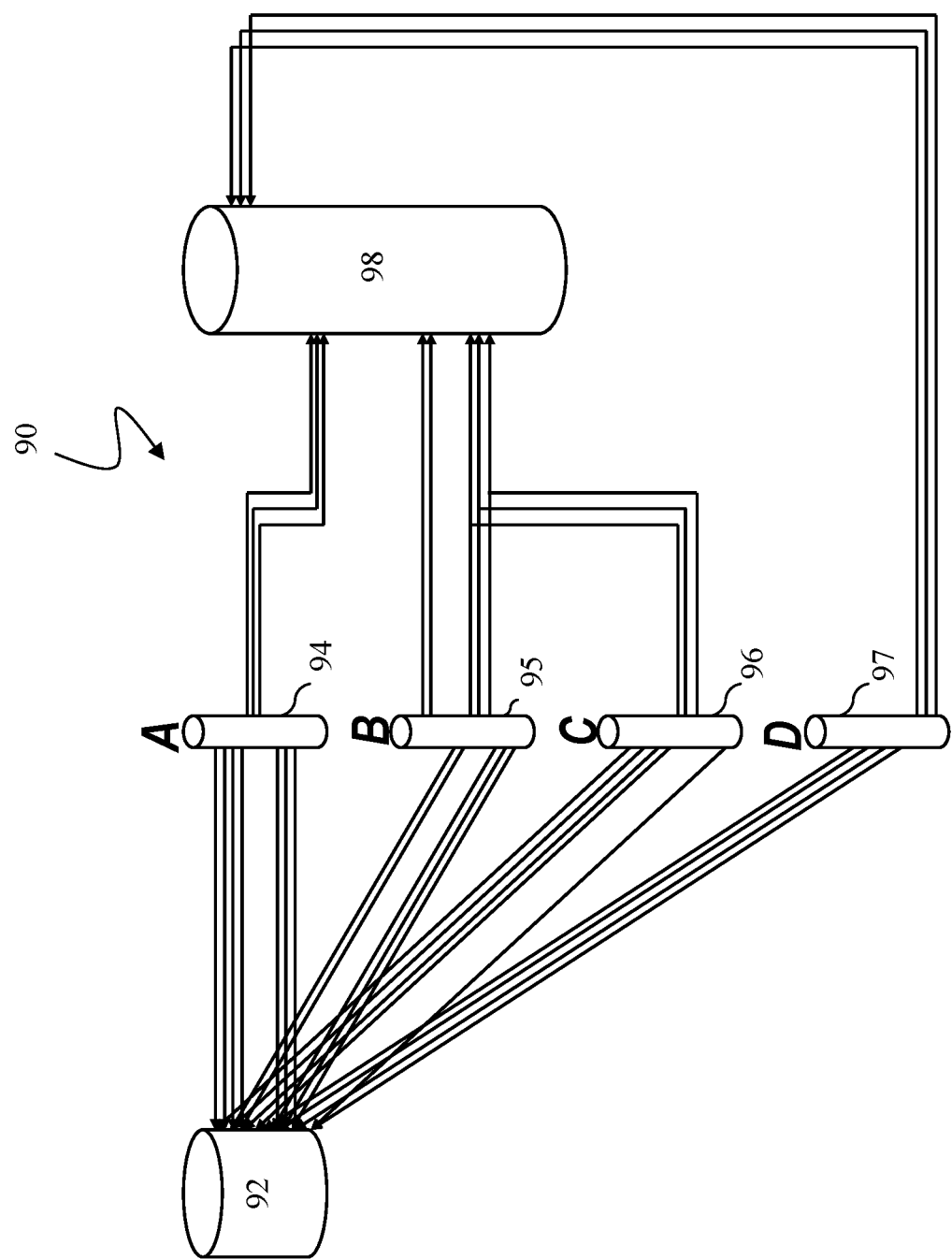
FIG. 5 is a schematic diagram showing another example of the use of virtual devices including a standard logical device, a plurality of point-in-time image devices and a journal device that may be used in connection with an embodiment of the system described herein.

FIG. 5 is a schematic diagram 90 showing another example of the use of virtual devices including a standard logical device 92, a plurality of point-in-time images 94-97 that may be generated by one or more point-in-time devices and a journal device 98 that may be used in connection with an embodiment of the system described herein. In the illustrated example, a point-in-time image 94 represents a point-in-time version of the standard logical device 92 taken at time A. Similarly, a point-in-time image of point-in-time image 95 represents a point-in-time version of the standard logical device 92 taken at time B, a point-in-time image 96 represents a point-in-time version of the standard logical device 92 taken at time C, and a point-in-time image 97 represents a point-in-time version of the standard logical device 92 taken at time D. Note that all of the point-in-time image 94-97 may share use of the journal device 98. In addition, it is possible for table entries of more than one of the point-in-time images 94-97, or, a subset of the table entries of the point-in-time image 94-97, to point to the same tracks of the journal device 98. For example, the point-in-time image 95 and the point-in-time image 96 are shown in connection with table entries that point to the same tracks of the journal device 98.

In an embodiment discussed herein, the journal device 98, and/or other journal devices discussed herein, may be provided by a pool of journal devices that are managed by the storage system 24 and/or other controller coupled to the SAN. In that case, as a point-in-time image device requires additional tracks of a journal device, the point-in-time image device would cause more journal device storage to be created (in the form of more tracks for an existing journal device or a new journal device) using the journal device pool mechanism. Pooling storage system resources in this manner is known in the art. Other techniques that do not use pooling may be used to provide journal device storage.

Figure 6:
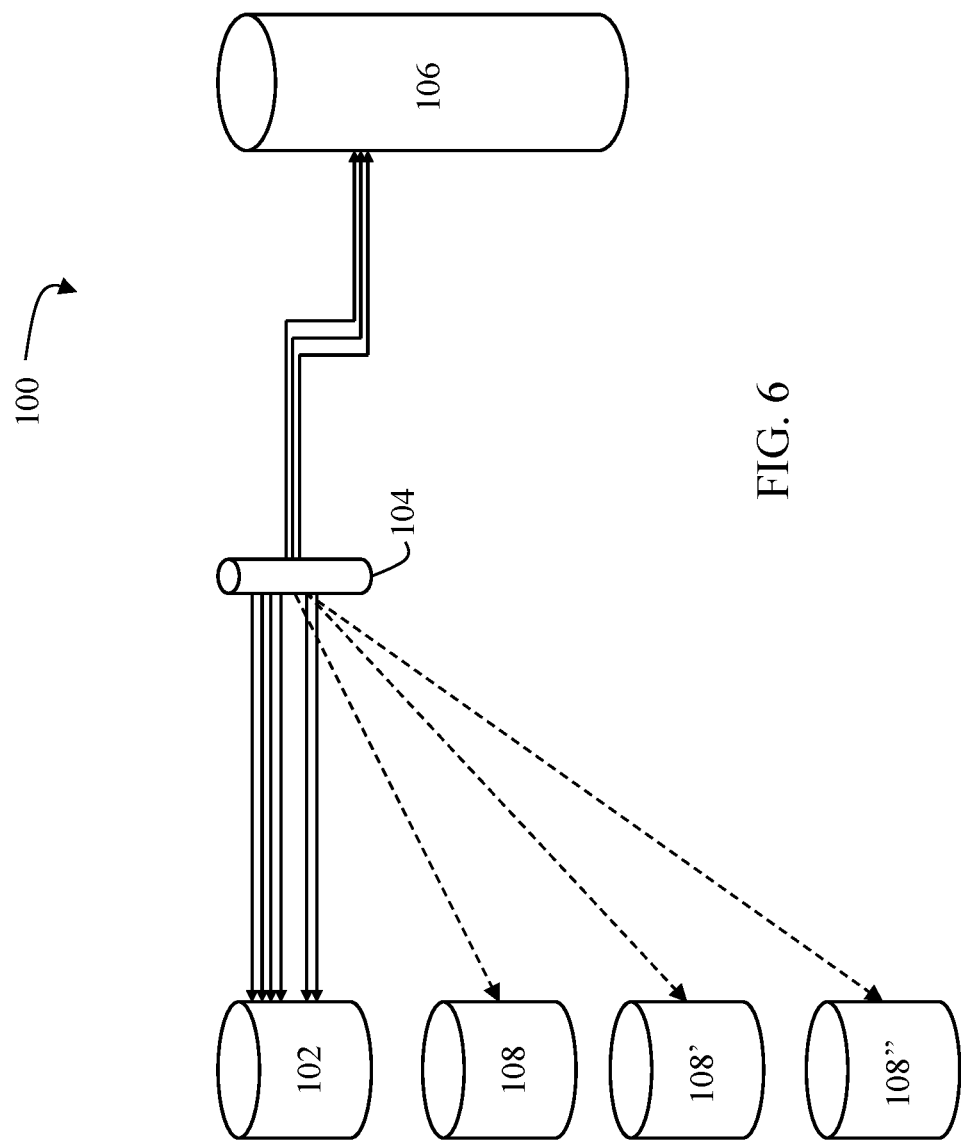
FIG. 6 is a schematic diagram that illustrates a system including a logical device, a point-in-time image device, a journal device, and a full copy device that may be used in connection with an embodiment of the system described herein.

FIG. 6 is a schematic diagram 100 that illustrates a system including a logical device 102, a point-in-time image device 104, a journal device 106, and a full copy device 108 that may be used in connection with an embodiment of the system described herein. As noted elsewhere herein, the logical device 102 may be implemented using any appropriate storage logical device mechanism. Similarly, the point-in-time image device 104 may be any logical point-in-time image device that can provide snapshot functionality, and/or other appropriate point-in-time image functionality, for the logical device 102. The journal device 106 provides storage for sections of data (e.g., tracks) of the logical device 102 that are overwritten after the point-in-time image device 104 has been initiated. The journal device 106 may be provided on the same physical device as the logical device 102 or may be provided on a different physical device.

In an embodiment, the system described herein may also be used in connection with full copies of data generated and stored according operation of the full copy device 108. The full copy device 108 may be a logical storage device like the logical device 102. As discussed in more detail elsewhere herein, the full copy device 108 may be configured to contain data copied from the logical device 102 and corresponding to one or more point-in-time images. As described below, the point-in-time image device 104 may create a point-in-time image and then, subsequently, data from the logical device 102, and possibly the journal device 106, may be copied and/or refreshed to the full copy device 108 in a background process that does not interfere with access to the logical device 102. Once the copy is complete, then the point-in-time image is protected from physical corruption of the data of the logical device 102, as discussed in more detail elsewhere herein. Note that, as shown in the figure, it is possible to have multiple copy devices 108', 108" etc. so that all of the copy devices 108, 108', 108" protect the point-in-time image from physical corruption. Accordingly, for the discussion herein, it should be understood that references to the copy device 108 may include, where appropriate, references to multiple copy devices. Note that, for some embodiments, the copy devices 108, 108', 108" may be copies provided at different times. Similarly, the system described herein may be applicable to multiple point-in-time copies provided at the same time or different times, like that shown in FIG. 5.

It is noted that the system described herein may be used in connection with use of consistency groups and with features for maintaining proper ordering of writes between storage systems. A consistency group represents a grouping of storage volumes (virtual or not) which together offer an application consistent image of the data. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage systems. The above-noted references are incorporated herein by reference.

In an embodiment of the system described herein, it is further noted that content protected by point-in-time images, such as snapshots, e.g. in connection with CS/CDP, may be extended to include not only user data but further include configuration metadata, and/or other appropriate configuration information, of the storage management system. Configuration metadata of the storage management system may be information used for configuration volumes, storage devices, consistency groups and/or other appropriate storage management system elements, as further discussed elsewhere herein. A user may want to rollback a storage management system to a past point due to performance or stability issues attributed to configuration changes. The system described herein enables rollback to prior states based on storage configuration metadata in addition to rollback of user data and provides for synchronization of the data and configuration metadata in connection with a rollback, as further discussed elsewhere herein. For further discussion of systems using point-in-time image technologies involving both user data and configuration metadata, reference is made to U.S. Pat. No. 9,128,901 to Nickurak et al., issued on Sep. 8, 2015, entitled, "Continuous Protection of Data and Storage Management Configuration," which is incorporated herein by reference.

Figure 7:
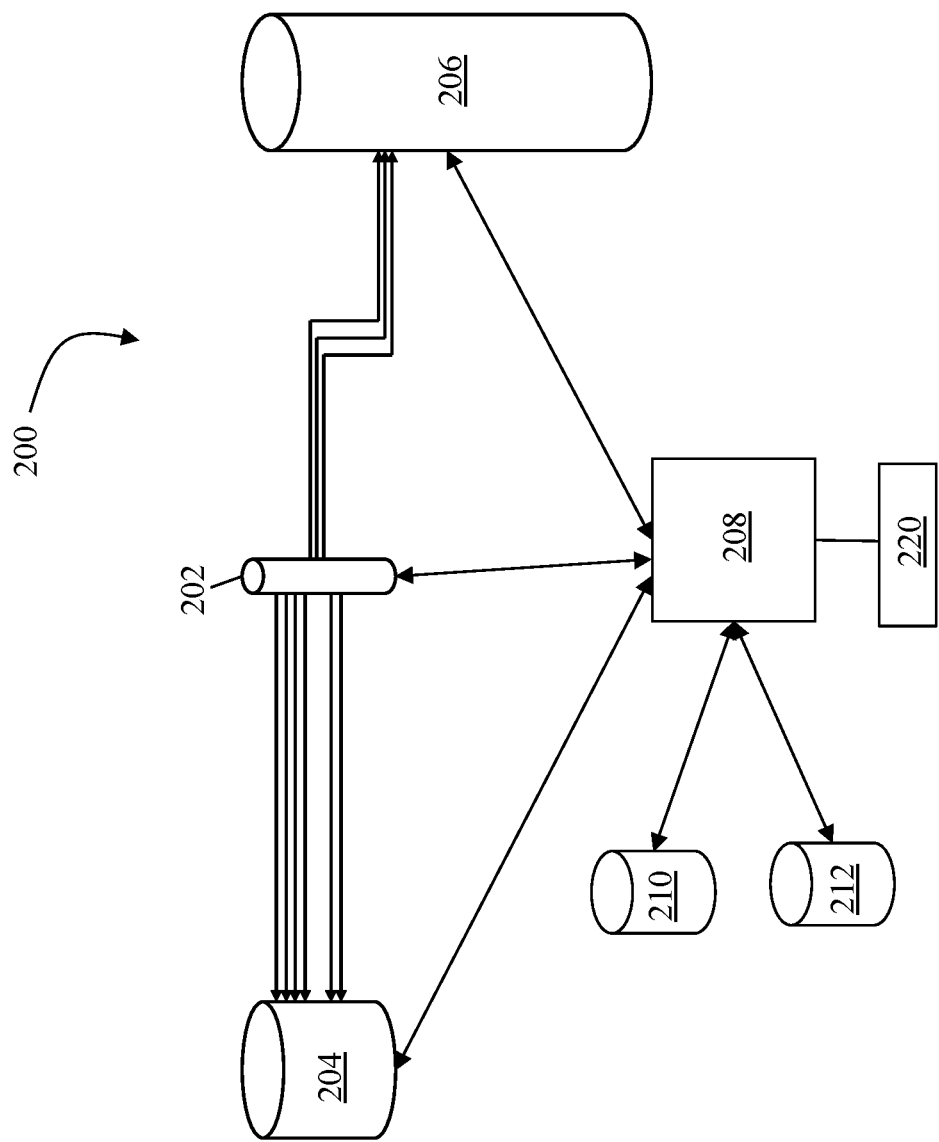
FIG. 7 is a schematic diagram that illustrates a continuous protection device that facilitates continuous or near continuous backup of data and storage configuration metadata using snapshots, other appropriate point-in-time images, according to an embodiment of the system described herein.

FIG. 7 is a schematic diagram 200 that illustrates a continuous protection device 202 that facilitates continuous or near continuous backup of data using snapshots, and/or other appropriate point-in-time images, and that may be used according to an embodiment of the system described herein. The continuous protection device 202 may contain pointers to a standard logical device 204 for a plurality of tracks such that, for any particular track, if the continuous protection device 202 points to a corresponding track of the standard logical device 204, then the corresponding track has not changed since creation of the continuous protection device 202. Note that any subsections, besides track, may be used to implement the system described herein. Accordingly, it should be understood in connection with the discussion that follows that although tracks are mentioned, other units of data having another size, including variable sizes, may be used. The continuous protection device 202 also contains pointers to a journal device 206 for a plurality of corresponding tracks. The journal device 206 contains data for tracks that have changed since creation of the continuous protection device 202.

The diagram 200 also shows an I/O module 208 that handles input and output processing to and from other modules, such as input and output requests made by the DA's 38a-38c and HA's 28a-28c. The I/O module 208 may be provided with information from a cycle counter 210 and/or a timer 212, among other possible information sources, that may be used to synchronize storage for a plurality of storage systems (i.e., a consistency group). The I/O module 208 may further include, and/or be coupled to, a user interface 220 that enables a user to tag data streams, among other functions as further discussed elsewhere herein. The user interface may be implemented using appropriate software and processors and may include a display and/or otherwise include operation using a display.

The system described herein allows for the ability to roll back/forward on multiple levels, including: per-volume basis, for configuration metadata and/or data; per-consistency group basis, for configuration metadata and/or data; per-system basis (all consistency groups, and system-wide configuration), for configuration metadata and/or data; and/or per-multi-system basis with the ability to control multiple systems with one user interface, for rolling management configuration and/or data. Other features and advantages of the system described herein include: elimination of manual storage configuration backups, which means reducing error-prone/inconvenient steps; elimination of manual storage configuration restores, which provides for reducing another set of error-prone/inconvenient steps; automatic write order fidelity across rollback in the presence of configuration changes; ability to control the roll back/forward points for management configuration/data independently. This allows choosing whether to roll management configuration back/forward only in those circumstances that warrant it; and/or ability to control the roll back/forward for configuration/data stream on a per volume and/or consistency-group and/or system-wide basis.

The system described herein allows for choosing the granularity of the roll back/forward of some of the system's volumes/consistency groups without requiring the whole system to roll back. Furthermore, the multi-system control aspect of the system described herein allows for restoring an organization's whole infrastructure (management configuration and data, independently) to a point in the past (or future) with the convenience of a single user interface.

According to the system described herein, techniques are provided for incremental Continuous Data Protection (iCDP) as a process to secure frequent, and space efficient, versions of consistent point-in-time images of a group of volumes using snapshot technology. In an embodiment, the group of volumes may be defined and organized as Versioned Data Group (VDGs). This system described herein may include tools and procedures to plan and operate a VDG and to use the member versions of the VDG to create and terminate target volume sets, particularly in connection with managing and/or optimizing use of log space on a journal or log device, as further discussed in detail elsewhere herein.

The system described herein provides for automation to create and manage frequent snapshots of defined groups of volumes. The incremental approach of the system described herein provides a convenient way to roll back to prior point-in-time versions to investigate data damage due to processing errors or other forms of corruption. The intervals between versions may be controlled. With sufficient resources the version increments may be controlled to be small, such as in minutes or smaller. The system beneficially provides for identifying, monitoring, and reclaiming use of log space in log devices in connection with managing recovery and roll back capabilities of the system to desired data versions for purposes of data protection. The system described herein may be implemented using any appropriate computing architecture and operating system, including, for example, using components of IBM Corporation's System z environment including use of z/OS and z/Architecture computing systems. For further discussion of the use of z/OS and z/Architecture components in simulated I/O environments, including techniques for the emulation of z/OS and z/Architecture components, reference is made to U.S. Pat. No. 9,170,904 to LeCrone et al, issued on Oct. 27, 2015, entitled "I/O Fault Injection Using Simulated Computing Environments," which is incorporated herein by reference.

The system described herein further provides for that by using target volume sets created from VDG version, repair strategies may be developed and tested without requiring the isolation of production systems or recreations to diagnose problems. Repairs may be possible on the source systems or the creation of a repaired replacement. Diagnostic target sets may not necessarily require full source image capacity. Techniques for iCDP implementation may include determining the storage capacity required for the associate snapshot log pool. Advantageously, the log capacity required according to the system described herein may be significantly less than the total duplication of source volumes capacity.

A point-in-time image (or snapshot) system architecture according to an embodiment of the system described herein may be storage efficient in that only first write track pre-write images are logged. The total number of unique tracks written while a snapshot version is active determines the log pool capacity consumed. If multiple versions are created the persistence of the track pre-write image in the pool is dependent on the number of previously activated versions that share that log entry. Reduction of log capacity consumption requires that a track pre-write image is no longer shared by versions. This is achieved by the termination of all snapshot versions sharing that image.

Multiple snapshot versions of a VDG set of volumes are created at regular intervals. Differential data tracking information, such as SDDF tracking information, may be used to analyze the write frequency and density of the source members of a VDG over a representative period of versioning intervals. Based on the analysis, the versioning intervals may be controlled to optimize the storage of the versions and the use of log capacity.

Pre-write images for tracks are created in the log pool or device when the first new write to a track occurs after a new snapshot version is activated. All subsequent writes to that track until the next interval are not logged since they are not needed to recreate a target image of the snapshot version. All prior versions containing the first write track share the same logged pre-write image. According to the system described herein, using the current source volumes and logged track pre-write images a selected version can be recreated on a target volume set.

SDDF provides a local function that marks modified (written) tracks and does not require any remote partner device. The differential update for local and remote devices uses the local and remote SDDF data to determine which tracks need to move to synchronize the pair. According to the system described herein, a first write analysis, as described elsewhere herein, may use local SDDF information that marks which tracks have been modified in a given interval. At the end of a current interval the SDDF information may be collected for future analysis and then cleared from the devices of interest. The SDDF mark, collect, and clear processes may repeat for each subsequent interval. The resulting collection of interval SDDF information provides maps of first writes that may be analyzed. VDG interval addition or reduction in log track space consumption may be determined. The collected SDDF maps may also contain information about persistence of shared first write tracks between VDG intervals.

For small interval SDDF first write maps collected, various VDG characteristics may be analyzed. For example, if the collected map intervals are 2 minutes VDG intervals of 2, 4, 6, 8 etc. . . . minutes may be analyzed for log space impact. The VDG interval duration and the number VDG intervals in a rotation set allows an analysis of rollback resolution (the time between snapshots) and log space consumption and management. The determination of log space versus how granular a CDP period and how far in the past is recovery possible may be assessed, as further discussed elsewhere herein.

FIGS. 8-11 are schematic illustrations showing representations of storage devices(s) in connection with a data protection system using a log device according to an embodiment of the system described herein.

Figure 8:
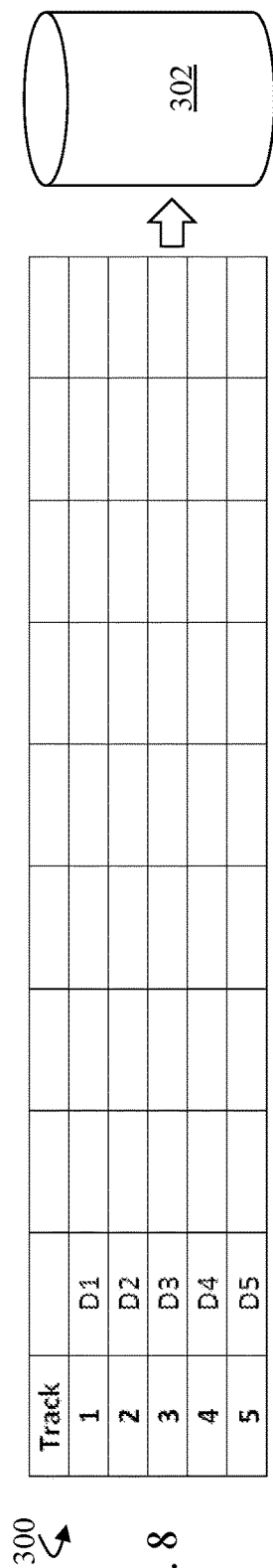
FIGS. 8-11 are schematic illustrations showing representations of devices in connection with a data protection system using a log device according to an embodiment of the system described herein.

FIG. 8 shows a representation 300 according to an embodiment of the data protection system described herein with a five track storage device for which each track one-five may contain source volume data D1-D5, respectively. A journal or log device 302 is shown, like that discussed elsewhere herein, that may be used in connection with data protection for purposes of roll back or other recovery processing. As discussed elsewhere herein, the log device 302 is not necessarily a single device and may include log capacity storage of a log pool comprised of one or more devices.

Figure 9:
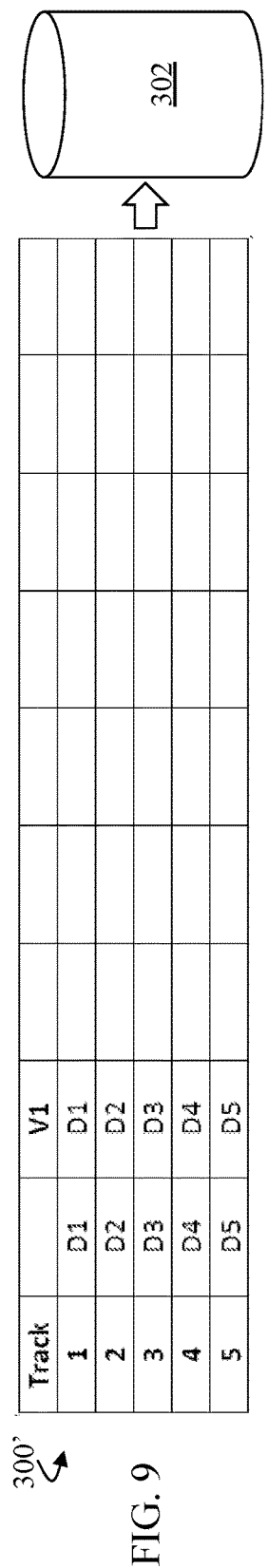

FIG. 9 shows a representation 300' according to an embodiment of the data protection system described herein showing a point-in-time image or version (V1) of data D3 made. There has been no write yet performed to the source data and thus there are no log entries in the log device 302. It is noted that the point-in-time version V1 of data D3 is illustrated in connection with Track three where the source volume of data D3 is stored. However, it is noted that the version V1 (and/or any other of the point-in-time versions discussed herein) may be stored in any appropriate storage location, including any suitable one or more of the devices discussed herein, and is not necessarily stored on Track three or any other of the tracks shown in connection with the five track storage system.

Figure 10:
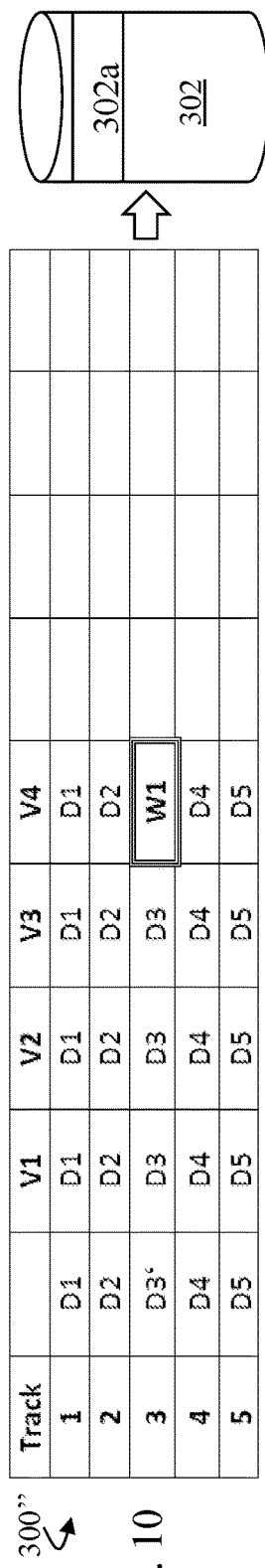

FIG. 10 shows a representation 300" according to an embodiment of the data protection system described herein showing additional point-in-time versions being made according to the system described herein. There are no writes to the devices over the intervals in which versions V2 and V3 are made, thereby versions V2 and V3 may be the same as version V1, and there are no required log entries for any versions V1-V3 in the log device 302. The figure shows that there are no writes to the device until the time of version V4 for a write (W1) to Track three (causing data D3' on the source volume) which causes a pre-write log entry 302a in the log device 302 to be logged according to the system described herein. The log entry 302a at the time of version V4 is a log entry corresponding to data D3.

Figure 11:
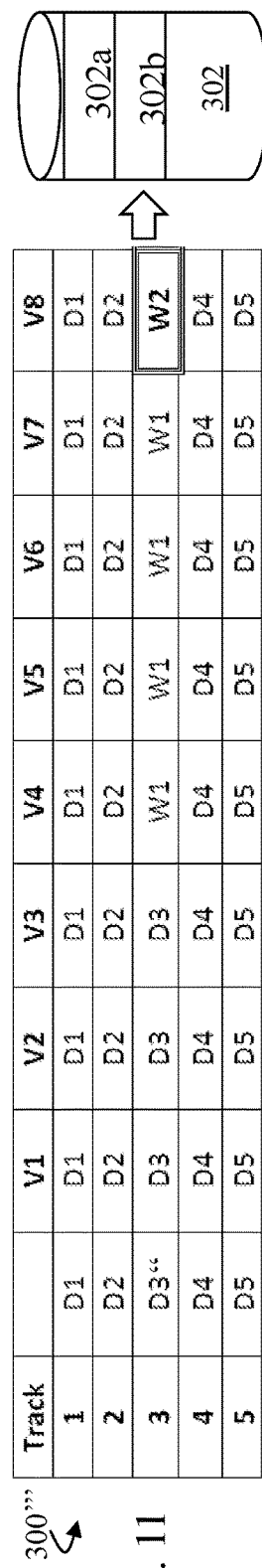

FIG. 11 shows a representation 300''' according to an embodiment of the data protection system described herein showing point-in-time version creation continuing until the time of version V8 when another write (W2) to Track three (resulting in data D3'' stored on the source volume) creates a pre-write log entry 302b in the log device 302 corresponding to the write W1 (for data D3'). The log entry 302b at the time of version V8 is a log entry corresponding to the write W1. Versions V1, V2, and V3 may share the log entry 302a holding D3. Versions V4, V5, V6, and V7 may share the log entry 302b holding W1. V8 (reflecting write W2) does not need log capacity until a subsequent write occurs.

The system described herein may be used to recover log space based on desired criteria. For example, the criteria may be to recover 50% of the log space, and a query may be as to which point-in-time version could be terminated to accomplish this such that log space for corresponding log entries may be reclaimed/recovered. Control and management of queries, criteria and/or result output may be performed using control modules and user interfaces like that discussed elsewhere herein (see, e.g., FIG. 7). Log persistence is where some number of versions share the same pre-write image. This could be representative of data that is periodic and only updated infrequently. In this case, the number of point-in-time versions necessary to terminate could be large in order to reclaim log space. Log entries for more active same track writes may be shared by a smaller number of versions, thereby requiring fewer version terminations to reclaim log space and recover desired log capacity.

Figure 12:
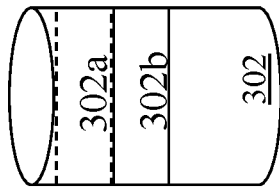
FIGS. 12-14 show scenario representations according to an embodiment of the system described herein for reclamation processing of a subject device to reclaim log capacity.
Figure 13:
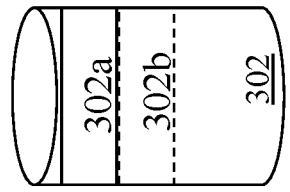
Figure 14:
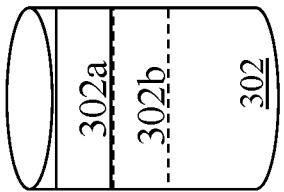

FIGS. 12-14 show scenario representations according to an embodiment of the system described herein for reclamation processing of a subject device to reclaim 50% of log capacity according to the scenario, discussed above, where Track three (storing data D3) is the subject of data writes. The example of reclaiming 50% log capacity as a criteria is discussed; however, it is noted the system described herein may be appropriately used in connection with reclaiming any desired amount or percentage of log capacity.

FIG. 12 is a schematic representation 301 showing that terminating point-in-time versions V1, V2, and V3 would allow the log entry 302a corresponding to data D3 to be reclaimed in the log device 302 (shown by dashed lines around log entry 302a). In this case, versions V4 through V8 persist with the W1 log pre-write image required to reconstitute V4 through V7. V8 has no pre-write image required yet.

FIG. 13 is a schematic representation 301' showing that, alternatively and/or additionally, terminating versions V4, V5, V6, and V7 allow the log entry 302b holding W1 to be reclaimed in the log device 302 (shown by dashed lines around log entry 302b). In this case, versions V1, V2, V3, and V8 persist with the log entry 302a for the D3 pre-write image required to reconstitute V1 through V3. V8 has no subsequent pre-write image required yet.

FIG. 14 is a schematic representation 301'' showing that, alternatively and/or additionally, terminating V5 through V8 allows the log entry 302b holding W1 to be reclaimed in the log device 302 (shown by dashed lines around log entry 302b). In this case, versions V1, V2, V3 share the log entry 302a for the D3 pre-write image to reconstitute V1 through V3. V4 has no subsequent pre-write image required.

Figure 15:
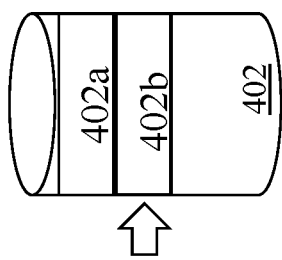
FIGS. 15 and 16 show scenario representations according to an embodiment of the system described herein for reclamation of a subject device when multiple tracks are involved to reclaim log capacity.
Figure 16:
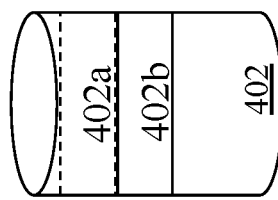

FIGS. 15 and 16 show scenario representations according to an embodiment of the system described herein for reclamation of a subject device when multiple tracks are involved to reclaim 50% of the log capacity.

FIG. 15 is a schematic representation 400 according to an embodiment of the system described herein showing an ending state of a scenario in which a write W1 was made to D3 (now data D3' on source volume) on Track 3 at a time of the version V4 and a write W2 was made to data D2 (now data D2' on source volume) on Track 2 at a time of version V8. Accordingly, in log device 402, log entry 402a corresponds to the D3 pre-write image created at the time of version V4 and log entry 402b corresponds to the D2 pre-write image created at the time of version V8.

FIG. 16 is a schematic representation 400' according to an embodiment of the system described herein showing reclaiming of 50% log capacity based on the scenario of FIG. 15. In this case, the D3 pre-write image is required by versions V1 through V3, and the D2 pre-write image is required by versions V1 through V7. Accordingly, only terminating V1 through V3 reclaims 50% of the log capacity, namely, the D3 pre-write image log space of entry 402a in the log device 402 (shown by dashed lines around the entry 402a). The D2 pre-write image of log entry 402b is the most persistent being shared by all versions except V8. The example of reclaiming 50% log capacity as a criteria has been discussed; however, it is noted the system described herein may be appropriately used in connection with reclaiming any desired amount or percentage of log capacity.

According to the system described herein, using data collected for the first writes to tracks in a volume group during a planning interval allows estimating the potential maximum capacity for the log pool that is needed for various frequency of version creation.

The system described herein provides that information on pre-write image log persistence or the number of consecutive versions sharing a log entry may also be analyzed. This provides information concerning how removing versions from the VDG effects log pool capacity reclamation. This information may be used for understanding the number of versions that may be removed to achieve a target log pool capacity. Accordingly, oldest versions and versions other than the oldest in a rotation set may be considered for removal.

Additionally, rotation of a set number of versions (the VDG) may be analyzed. First writes in an interval give the net add to log pool capacity consumption. In this case, termination of the oldest version member in the rotation set may give the potential maximum reduction in log consumption. The actual reduction is dependent on the number of versions sharing a particular track pre-write image. When a target log pool size is desired the number of versions to terminate can be analyzed.

In a VDG rotation cycle the oldest member version would be removed prior to adding a new version. The log capacity may need to be the maximum expected concurrent log pre-write image capacity plus a margin for safety. It is noted that demand reclaim from oldest to newest may require the least active analysis. For example, using differential data write monitoring, such as SDDF write monitoring, for each version allows for a log capacity by version metric. However, reclaiming pre-write image log capacity may involve termination of some number of versions to achieve a desired log capacity reduction. As seen, for example, in the scenarios discussed herein, three versions (V1, V2, and V3) may need to be terminated before the single pre-write image log capacity associated with the data D3 can be reclaimed.

A worst case would be where many versions with low or no writes are created and during the most recent version having most or all tracks written. An example might be where a DB2 table create and format occurs in generation 100 and the prior 99 versions share the pre-write images of the involved tracks. The 99 prior versions would need to be terminated before the pre-write image log capacity could be reclaimed.

Exempting particular versions from rotation termination makes this problem even more evident. While capacity consuming (equal to the source capacity of the VDG) creating a full copy target and unlinking it after being fully populated would be an operational tradeoff to diminishing impact on log reclamation by holding one or more versions exempt from termination.

In another embodiment, the system described herein may be used in connection with a continuous review of which versions contribute the least to log capacity but share the most images with other versions. Referring, for example, back to FIG. 15, in this case it is noted that versions V1, V2, V5, V6 and V7 could all be terminated without losing any unique version of the source volume data. V3, V4, and V8 are unique versions for this source volume.

Figure 17:
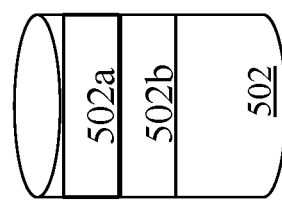
FIG. 17 is a schematic representation according to the embodiment of the system described herein shown in FIG. 15 in which versions have been terminated, but all unique first write pre-write images in each version interval are preserved.

FIG. 17 is a schematic representation 500 according to the embodiment of the system described herein shown in FIG. 15 in which versions V1, V2, V5, V6 and V7 have been terminated, but all unique first write pre-write images in each version interval are preserved. Tracks with data D1, D2, D3, D4, D5, W1, and W2 and the versions that consistently relate them in time are available to create useable target sets based on use of the log entries 502a, 502b of the log device 502. This can be determined by tracking the first write differential (SDDF) data for each version interval.

According further to the system described herein, it is noted that with a VDG creating short interval snapshot members it is possible that some VDG members will have no first write activity and can be terminated after the next interval VDG is activated. If there is first write activity within the VDG there may be subgroupings in that VDG interval that do not have any first writes for the interval. If a subgroup is identified by the user as logically-related volumes (a particular application, for example) only the snapshots of the volumes in that subgroup may be terminated if there are no first write to that subgroup. This could also apply to single volumes within the VDG that do not have interdependent data with other volumes in the VDG. These determinations may be specified by the user of the VDG control mechanism.

Figure 18:
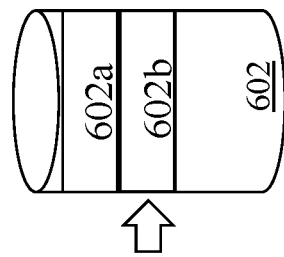
FIGS. 18 and 19 show scenario representations according to an embodiment of the system described herein for reclamation of a subject device when multiple volumes are involved to reclaim log capacity.
Figure 19:
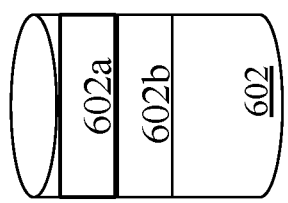

Accordingly, FIGS. 18 and 19 show scenario representations according to an embodiment of the system described herein for reclamation of a subject device when multiple volumes are involved to reclaim log capacity. Specifically, in an embodiment, the system described herein may also be used in connection with application to volumes instead of tracks and may provide for continuously collapsing volume log images.

FIG. 18 is a schematic representation 600 according to an embodiment of the system described herein showing an ending state of a scenario for storage of 5 volumes (Volumes one-five) and for which eight point-in-time versions (V1-V8) thereof have been made. The representation 600 shows a state in which a write W1 was made to D3 (now data D3') of Volume three at a time of the version V4 and a write W2 was made to data D2 (now data D2') of Volume two at a time of version V8. Accordingly, in log device 602, log entry 602a corresponds to the D3 pre-write image created at the time of version V4 and log entry 602b corresponds to the D2 pre-write image created at the time of version V8.

FIG. 19 is a schematic representation 600' according to the embodiment of the system described herein shown in FIG. 18 in which versions V1, V2, V5, V6 and V7 have been terminated, but all unique first write pre-write images of the volumes in each version interval are preserved. The capability for reconstruction of a VDG point-in-time when constituent member volumes may have their snapshot terminated is illustrated in the figure. Point in time V1, V2 and V3 can independently be reconstructed using the original data images D1 through D5 of the Volumes one-five and the log entries 602a, 602b of the log device 602. V5, V6, and V7 only need the W1 first write from V4. Reconstruction of version V8 needs the Volume three version V4 for W1 and itself for the Volume two W2 first write pre-write image. This figure depicts the minimum (3 versions) needed to reconstruct eight distinct points in time for the illustrated volumes. A first write to any single track on a volume requires the volume snapshot to be preserved.

Figure 20:
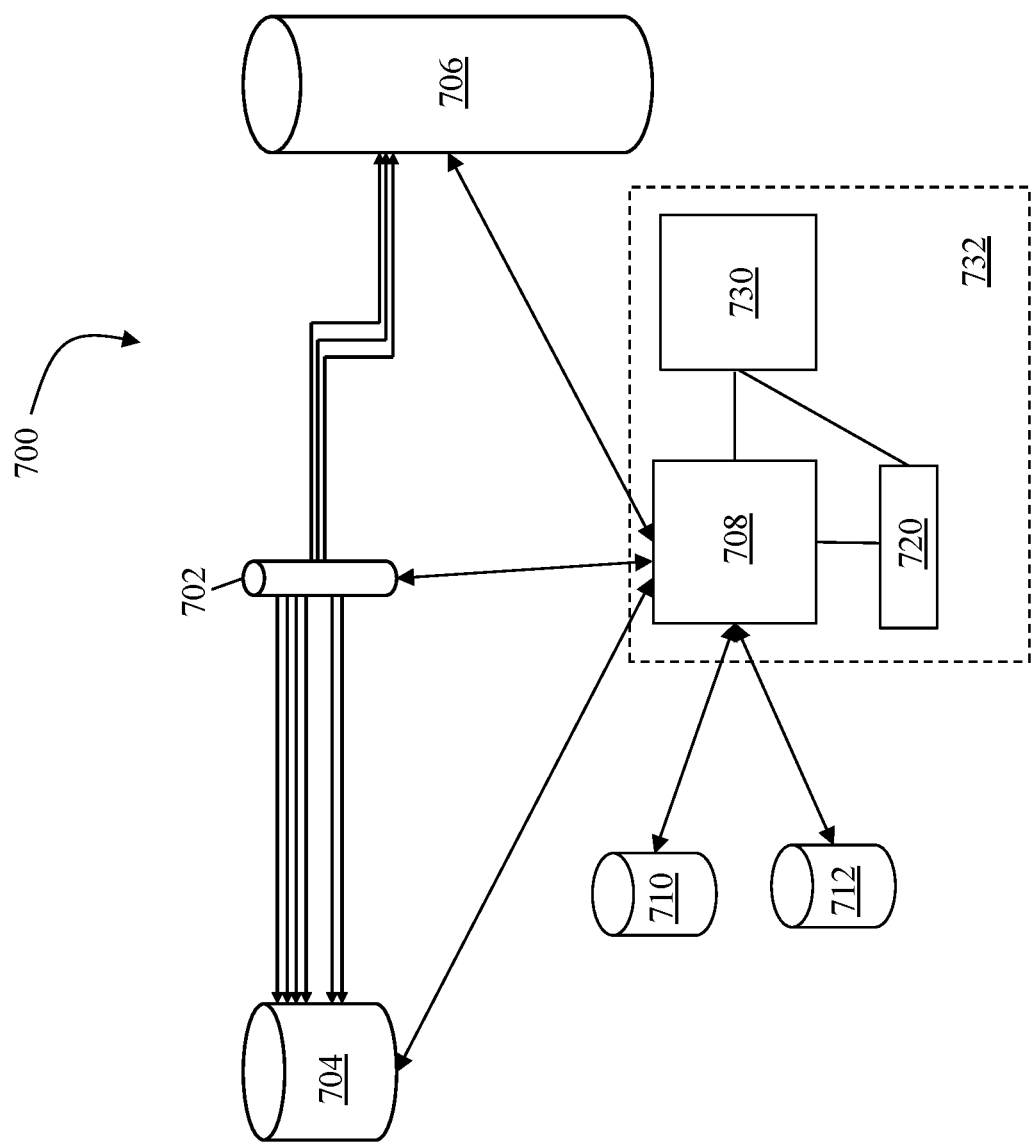
FIG. 20 is a schematic diagram showing a system implementing iCDP (incremental continuous data protection) according to an embodiment of the system described herein.

FIG. 20 is a schematic diagram showing a system 700 implementing iCDP according to an embodiment of the system described herein. A point-in-time image device 702 may facilitate continuous or near continuous backup of data using snapshots, and/or other appropriate point-in-time images, as further discussed in detail elsewhere herein. The point-in-time image device 702 may contain pointers to a standard logical device 704 for a plurality of tracks storing data. The point-in-time image device 702 may also contain pointers to a log device 706 logging data changes to corresponding tracks, as further discussed in connection with the scenarios discussed elsewhere herein.

The system 700 may also include a I/O module 708 that handles input and output processing in connection with receiving and responding to requests and criteria concerning the providing of efficient data protection operations in accordance with the system described herein. The I/O module 708 may be provided with information from a cycle counter 710 and/or a timer 712, among other possible information sources, that may be used in connection with storage of data among a plurality of storage systems (i.e., for a consistency group and/or VDG). The I/O module 708 may further include, and/or be coupled to, an interface 720 that enables interaction with users and/or hosts in connection with operation of the system described herein.

A point-in-time data analytic analyzer 730 is shown that may be used to automatically/programmatically determine which point-in-image to roll back for one or more data recovery operations according to an embodiment of the system described herein. For example, information, such as host meta structures, may be available to the analyzer 730 to facilitate the scanning and/or identification of logical data corruption or errors. Such host meta structures may include structures of IBM's System z environment, as discussed elsewhere herein, such as logical structures of a volume table of contents (VTOC), VTOC index (VTOCIX), virtual storage access method (VSAM) volume data sets (VVDS), catalogs and/or related structures that are logical in nature and which may be used in connection with the scanning for logical failures rather than physical failures, and may indicate what a user or customer may be looking for in a roll back or recovery scenario. For example, in an IBM mainframe storage architecture, a VTOC provides a data structure that enables the locating of the data sets that reside on a particular disk volume, and the z/OS may use a catalog and the VTOC on each storage system to manage the storage and placement of data sets. In an embodiment, the system described herein may then use these structures to efficiently provide desired roll-back and data protection operations according to the features discussed herein.

It is noted that the I/O module 708, interface 720 and/or analyzer 730 may be separate components functioning like that as discussed elsewhere herein and/or may be part of one control unit 732, which embodiment is shown schematically by dashed lines. Accordingly, the components of the control unit 732 may be used separately and/or collectively for operation of the iCDP system described herein in connection with the creation, maintenance, identification and termination of point-in-time image versions to respond to requests and criteria, like that discussed elsewhere herein, including criteria concerning identification of necessary point-in-time versions to fulfil desired roll back scenarios and criteria involving the efficient use of log capacity to maintain the desired data protection capability.

For operation and management functions, the system described herein may provide for components like that discussed herein that may be used to create a VDG volume group and support sets of selection options, such as Group Name Services (GNS) in connection with data protection operations. The system described herein may further be used to define version interval frequencies and to define the maximum number of member versions in a VDG. Options for when the maximum is reached may include rotation when the oldest version is terminated before the next version is created, stopping with notification, and terminating n number of oldest versions before proceeding, etc. The system may further define target volume set(s) and validate that the type, geometry, and number match the related VDG.

The system described herein provides for automation to manage one or more VDGs. Point-in-time versions may be created based on defined interval criteria on a continuing cycle. VDG version rotation may be provided to remove the versions prior to next VDG version creation. The number of VDG version terminations necessary to achieve a log pool capacity target may be tracked. Host accessible images of selected VDG versions may be created and metadata of the target set may be managed to allow successful host access. Metadata management may include: validation of type and number of target volumes; online/offline volume verification; structure checking of a target volume set; optional volume conditioning; catalog management and dataset renaming; and providing alternate logical partition (LPAR) access.

A target volume set may be created from a selected VDG version and a user may be provided with selected copy and access options. A selected target volume set may be removed and which may include validating a target volume set system status, providing secure data erase of target volume set volumes and/or returning target volume sets to available pools. Specific versions may also be removed and the system supports explicit version termination, as discussed in detail elsewhere herein.

The system described herein may provide for monitoring and reporting functions using components like that discussed elsewhere herein. The status of created versions in a VDG may be monitored. Log pool capacity may be monitored and the system may provide for alerts and actions for log pool capacity targets, log capacity reclaim reports may be generated when versions are removed (i.e. during cycle rotation), and active target volume sets needed to be removed to allow the removal of a version may be identified. The status of an active target volume set, and related VDG versions may be monitored. The status of target volumes sets created outside (unmanaged) of the VDG environment may be monitored. Versions needed to be removed to reclaim some target amount of log pool capacity may be identified, as discussed in detail elsewhere herein.

Referring to FIG. 21, a diagram 800 illustrates the storage device coupled to a cloud storage 802. The cloud storage 802 may be a private cloud storage provided by an organization for its own internal use, a semi-private cloud storage provided by a collection of organizations for use by members, or a public cloud storage such as Amazon Web Service (AWS) or Microsoft Azure. The cloud storage 802 provides security controls so that only authorized users may access data and possibly so that it is possible for some of the users to only be able to read data. In an embodiment herein, the cloud storage 802 may be accessible from any location via the World Wide Web, although it may be possible to impose restrictions on access, such as geographic restrictions (e.g., prohibiting access from Internet addresses originating in certain countries). In other embodiments, the cloud storage 802 may be part of a private network that is not generally accessible, but may nonetheless be geographically diverse.

The storage system 24, discussed above, is coupled to the cloud storage 802 and exchange data therewith. A data connection between the storage system 24 and the cloud storage 802 may be provided by any appropriate mechanism, including the Internet, other TCP/IP networks, dedicated connections, FICON connections, etc. In some embodiments, the system may be configured to cause the storage system 24 to exchange data with the cloud storage 802 using protocols for exchanging data directly between storage systems, including synchronous and asynchronous protocols, and using the RAs 30a-30c, discussed above, or similar. In such a case, the cloud storage 802 may effectively emulate a storage system for purposes of exchanging data with actual storage systems. In some instances, the emulation may be provided, at least in part, by operation of actual storage systems that are connected to the cloud storage 802. Data is migrated from the storage system 24 to the cloud storage 802. The storage system 24 may be interacting with the host 22 at least during an initial phase of the migration.

Referring to FIG. 22, a flow diagram 900 illustrates processing performed in connection with transferring data to the cloud storage 802 to facilitate disaster recovery at a source data center. Processing begins at a first step 902 where the system detects that a snapshot has been completed. Creating multiple snapshots of volumes is discussed in more detail elsewhere herein. Following the step 902 is a step 904 where the storage device 24 connects to the cloud storage 802 using whatever mechanism is appropriate for the type of cloud storage that is being used. Following the step 904 is a step 906 where the storage device transfers to the cloud storage a previous version of the entire volume on which the snapshot is being performed. For example, if a snapshot is being performed on a volume every five minutes, and a completed snapshot is detected at the step 902 at 1:10 pm, then, at the step 906, the storage device 24 transfers a version of the volume at 1:05 (previous version). If necessary, disaster recovery may be performed by recovering the entire volume from the cloud storage 802. Following the step 906, control transfers back to the step 902, discussed above, for another iteration.

Referring to FIG. 23, a flow diagram 920 illustrates steps performed in connection with ensuring that a version of a snapshot is not deleted at the storage device 24 unless and until an entire version of the volume corresponding to the snapshot has already been transferred to the cloud storage 802. Processing begins at a first step where initiation of a snapshot deletion is detected. Following the step 922 is a test step 924 where it is determined if copying a volume corresponding to the snapshot (discussed above) is completed. If not, then the system continues to wait for completion. If it is determined at the step 924 that copying the volume corresponding to the snapshot is completed, then control transfers from the step 924 to a step 926 where deletion of the snapshot is allowed to commence. Following the step 926, processing is complete.

Referring to FIG. 24, a flow diagram 940 illustrates an alternative embodiment where, after initially transferring an entire volume corresponding to a snapshot, only new data that has been written is transferred to the cloud storage 802. Note that, even without copying an entire volume at each iteration, it is still possible to reconstruct a volume at any point in time after the system is initiated. Processing begins at a first step 942 where an entire volume (base volume) is copied from the storage device 24 to the cloud storage 802. Following the step 942 is a step 944 where the system detects that a snapshot has been completed. Processing at the step 944 is similar to the processing at the step 902, discussed above. Following the step 944 is a step 946 where data that has been written to the volume following creation of the snapshot is transferred from the storage device 24 to the cloud storage. Note that the amount of data transferred at the step 946 is expected to be significantly less than the amount of data transferred at the step 906, discussed above, where an entire volume is transferred to the cloud storage. Following the step 946, control transfers back to the step 944, discussed above, for another iteration.

The system described herein may be used in connection with one or more products provided by Dell EMC of Hopkinton Mass., including the ZDP product and/or the SnapVX product (possibly including the change track report provided by the SnapVx product). Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage systems having components as described herein may, alone or in combination with other devices, provide an appropriate platform that executes any of the steps described herein. The system may operate with any snapshot mechanism not inconsistent therewith and further with any appropriate point-in-time image mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of maintaining versions of data from a storage system, comprising:
   creating a first point-in-time snapshot image device containing a table with entries that point to one of: a standard logical device at the storage system or a log device at the storage system, wherein the log device contains data that is provided thereto in response to a first write to separate sections of data of the standard logical device following a time of creation of the first point-in-time snapshot image and wherein a host accessing the point-in-time snapshot image device accesses data from either the standard logical device or the log device based on whether the data has been modified since creating the first point-in-time snapshot image device;
   following creating the first point-in-time snapshot image device, transferring data for the first point-in-time snapshot image device to a cloud storage that is separate from the storage system by transferring data from the log device and transferring a previous version of the standard logical device that existed prior to creating the first point-in-time snapshot image device; and
   prohibiting deletion of data for the previous version of the standard logical device at the storage system until after the data for the first point-in-time snapshot image device has been completely transferred to the cloud storage.

2. A method, according to claim 1, wherein the data for the first point-in-time snapshot image device corresponds to a volume on the storage system.

3. A method, according to claim 1, wherein the cloud storage is public cloud storage.

4. A method, according to claim 1, wherein the cloud storage is part of a private network.

5. A method, according to claim 1, wherein the cloud storage is accessible from any location via the World Wide Web.

6. A method, according to claim 1, wherein a connection between the storage system and the cloud storage is provided by one of: the Internet, a TCP/IP network, or a dedicated connection.

7. A method, according to claim 1, wherein the separate sections of data are separate tracks of the standard logical device.

8. A method, according to claim 1, further comprising:
   deleting the previous version of the data for the standard logical device after the data for the point-in-time snapshot image device has been completely transferred from the storage system to the cloud storage.

9. A method, according to claim 1, further comprising:
   following transferring the previous version of the standard logical device that existed prior to creating the first point-in-time snapshot image device, transferring data for a second point-in-time snapshot image device to the cloud storage by transferring only data that has changed since creation of the second point-in-time snapshot image device, wherein the second point-in-time snapshot image device is created after the first point-in-time snapshot image device.

10. A non-transitory computer readable medium containing software that maintains versions of data from a storage system, the software comprising:

executable code that creates a first point-in-time snapshot image device containing a table with entries that point to one of: a standard logical device at the storage system or a log device at the storage system, wherein the log device contains data that is provided thereto in response to a first write to separate sections of data of the standard logical device following a time of creation of the first point-in-time snapshot image and wherein a host accessing the point-in-time snapshot image device accesses data from either the standard logical device or the log device based on whether the data has been modified since creating the first point-in-time snapshot image device;

executable code that, following creating the first point-in-time snapshot image device, transfers data for the first point-in-time snapshot image device to a cloud storage that is separate from the storage system by transferring data from the log device and transferring a previous version of the standard logical device that existed prior to creating the first point-in-time snapshot image device; and executable code that prohibits deletion of data for the previous version of the standard logical device at the storage system until the data for the first point-in-time snapshot image device has been completely transferred to the cloud storage.

11. A non-transitory computer readable medium, according to claim 10, wherein the data for the first point-in-time snapshot image device corresponds to a volume on the storage system.

12. A non-transitory computer readable medium, according to claim 10, wherein the cloud storage is public cloud storage.

13. A non-transitory computer readable medium, according to claim 10, wherein the cloud storage is part of a private network.

14. A non-transitory computer readable medium, according to claim 10, wherein the cloud storage is accessible from any location via the World Wide Web.

15. A non-transitory computer readable medium, according to claim 10, wherein a connection between the storage system and the cloud storage is provided by one of: the Internet, a TCP/IP network, or a dedicated connection.

16. A non-transitory computer readable medium, according to claim 10, wherein the separate sections of data are separate tracks of the standard logical device.

17. A non-transitory computer readable medium, according to claim 10, further comprising:

executable code that deletes the previous version of the data for the standard logical device after the data for the point-in-time snapshot image device has been completely transferred from the storage system to the cloud storage.

18. A non-transitory computer readable medium, according to claim 10, further comprising:

executable code that, following transferring the previous version of the standard logical device that existed prior to creating the first point-in-time snapshot image device, transfers data for a second point-in-time snapshot image device to the cloud storage by transferring only data that has changed since creation of the second point-in-time snapshot image device, wherein the second point-in-time snapshot image device is created after the first point-in-time snapshot image device.

* * * * *

UNITED STATES PATENT AND TRADEMARK OFFICE
CERTIFICATE OF CORRECTION

PATENT NO. : 11,265,374 B2
APPLICATION NO. : 16/653029
DATED : March 1, 2022
INVENTOR(S) : Douglas E. LeCrone et al.

It is certified that error appears in the above-identified patent and that said Letters Patent is hereby corrected as shown below:

On the Title Page

Page 2, item (56) Reference Cited:
Reference 2015/0227602 A1 8/2015 Ram,
Should be corrected to read:
"2015/0227602 A1 8/2015 Ramu".

Signed and Sealed this
Twenty-third Day of August, 2022

Katherine Kelly Vidal
*Director of the United States Patent and Trademark Office*